Nov. 15, 1949         J. SWISS         2,488,446
POLYTETRAFLUOROETHYLENE CASTING MOLD
Filed Dec. 12, 1945
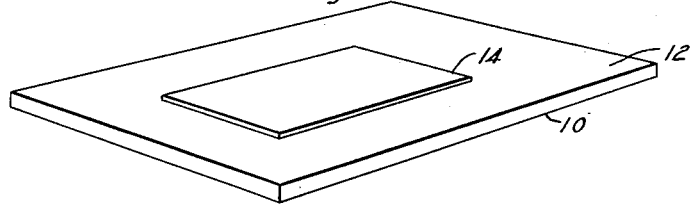
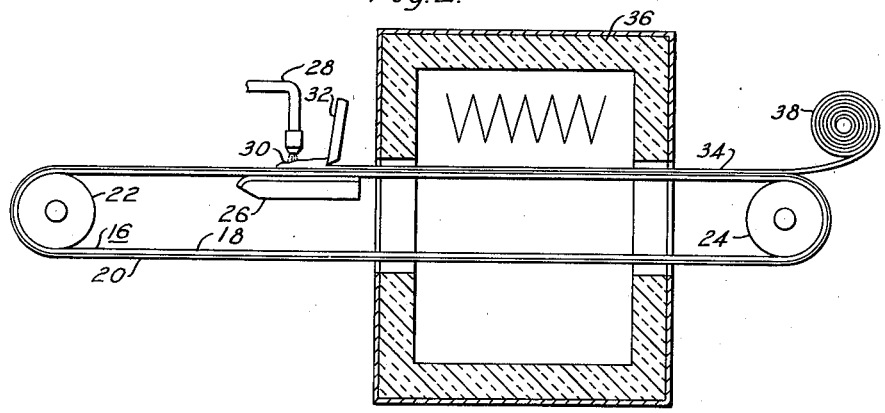
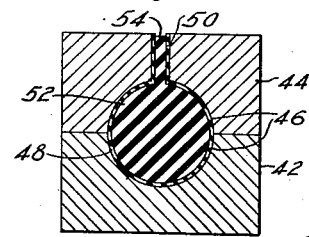
WITNESSES:
INVENTOR
Jack Swiss.
BY Ezra D. Savage
ATTORNEY Patented Nov. 15, 1949

2,488,446

UNITED STATES PATENT OFFICE 2,488,446

POLYTETRAFLUOROETHYLENE CASTING MOLD

Jack Swiss, McKeesport, Pa., assignor to Westinghouse Electric Corporation, East Pittsburgh, Pa., a corporation of Pennsylvania Application December 12, 1945, Serial No. 634,550

4 Claims. (Cl. 18—47)

This invention relates to the preparation of solid bodies of predetermined shape and surface texture from fluid resinous and other moldable or castable materials.

Heretofore films of resinous materials and other bodies have been prepared almost entirely by casting or molding a fluid resinous composition on a metallic base member and, after hardening to a solid state, separating the cast body from the metallic base member. Great difficulty is encountered in selecting a suitable metallic base having only a relatively moderate adherence to the resinous material. In some cases chromium plated drums have been employed for preparing films from a certain few resinous compositions, and the separation of the films has been accomplished without excessive difficulty. Other resinous compositions are much more tenaciously adherent to chromium and their separation cannot be as successfully accomplished. Another expedient is to effect the separation of a cast or molded resinous member from a tin surface by amalgamation of the tin with mercury. This procedure is not only costly and time-consuming, but the process cannot be carried out at temperatures over 170° C. due to the oxidation of the tin.

Accordingly, there is a considerable demand for a mold material that can be employed for the molding or casting of resinous and other materials of such a nature that the cast resinous materials and the like, when solidified, will not adhere thereto but can be easily stripped. The mold material should be inert to nearly all the common solvents, catalysts, plasticizers and addition agents that may be present in the resinous compositions in order to prevent excessive adhesion and deterioration of the mold surfaces. Furthermore, such mold material, in order to be employed satisfactorily in the preparation of solid bodies of certain resinous compositions, should be capable of withstanding temperatures of as high as 300° C. without physical or chemical deterioration.

I have discovered that polymerized tetrafluoroethylene has the unexpected property of not bonding appreciably to practically all types of resinous compositions which may be cast thereon in a fluid condition and thereafter converted to a solid state. Polymerized tetrafluoroethylene is chemically inert to nearly all resins, solvents, plasticizers and other addition agents in resinous compositions. Thus solutions of organo-silicon oxides, phenol formaldehyde, cellulose acetate and numerous other resins can be applied to polymerized tetrafluoroethylene, the solvent evaporated and the resin, if not fully polymerized, can be subjected to polymerization at high temperatures without the compositions bonding or appreciably adhering to the tetrafluoroethylene base. The resins cast on surfaces of tetrafluoroethylene form replicas that match the texture and condition of the surfaces of the polymerized tetrafluoroethylene faithfully. Heat treatment at temperature up to 300° C. does not deteriorate the polymerized tetrafluoroethylene during such molding or casting operations. In numerous tests of the utility of tetrafluoroethylene, it has been found that it forms an almost ideal base for the preparation of solid bodies from fluid compositions which are to be converted by the action of heat and other agents to the solid state.

The object of this invention is to provide a means for preparing molded resinous bodies.

A still further object of the invention is to provide a base material on which resinous compositions may be molded and thereafter converted to solid bodies without adhering thereto.

Other objects of the invention will in part be obvious and will in part appear hereinafter. For a better understanding of the nature and objects of this invention, reference should be had to the appended description and drawing in which:

Figure 1 is a perspective view of the casting of a film;

Fig. 2 is a view in elevation, partly in section, of an apparatus for casting a continuous length of film; and Fig. 3 is a cross-sectional view of a mold for casting complex objects.

In accordance with this invention, fluid compositions capable of being converted to solid bodies are molded, cast, or otherwise applied in contact with a base form whose surfaces are composed of polymerized tetrafluoroethylene. The polymerized tetrafluoroethylene is readily prepared with a surface texture matching the desired surface condition of the solid member to be produced by the conversion of the fluid composition. By "matching" is meant that the surfaces of the solid and the form are capable of interfitting when superimposed, that is, they have the relation of a positive to a negative. It is possible by the practice of this invention to produce not only films or sheets, but to produce all desired solid shapes and forms of members that can be secured by molding a fluid composition in a mold or die.

Referring to Fig. 1 of the drawing, the form comprises a base 10 composed of a polymerized tetrafluoroethylene sheet having a surface 12 of any suitable texture. The polymerized tetrafluoroethylene sheet may be composed of the polymer alone or may be composed of the polymer reinforced with glass fibers, asbestos cloth, or metal cloth, or the like, or finely divided fillers such as calcium fluoride, graphite, mica, molybdenum disulphide and the like to impart strength, a predetermined surface texture, or for any other purpose.

To secure a selected texture, the surface 12 may be polished to a high degree of smoothness in order that any solid body produced by forming thereon will likewise have a high degree of smoothness. Such smooth surfaces may be employed for casting sheets or blocks of resin to be employed in optical work, for example, as microscope cover glass slides, prisms and lenses. Alternatively, the surface 12 may be roughened by sandblasting or by knurling or grooving to produce a predetermined texture.

In one case the sheet 10 of polymerized tetrafluoroethylene was polished on a metallurgical sample polishing wheel to produce an extremely smooth surface 12. Thereafter a solution of a partially polymerized methyl phenyl silicon oxide dissolved in toluene was applied to the surface 12 to produce a layer 14. The member was heated to evaporate the volatile solvent. Then a second polymerized tetrafluoroethylene sheet similar to 10 was pressed under moderate pressure over the layer 14 to reduce the layer to a uniform thickness throughout and the sandwich so prepared was placed in an oven and baked at 250° C. for eight hours. Thereafter the sandwich was removed from the oven and the sheets of polymerized tetrafluoroethylene were easily separated and a film 14 of unusual surface smoothness was secured. The sheet 10 may be reused indefinitely. It will be appreciated that the films 14 may be made as large as desired. Films of various organic silicon oxide polymers only one or two thousandths of an inch in thickness have been easily produced by casting a fluid composition upon a polymerized tetrafluoroethylene surface and then polymerizing to a solid state. Films of methyl silicon oxide polymers having from 1.0 to 1.9 methyl groups per silicon atom and films of phenyl ethyl silicon oxide polymers have been so produced. Numerous other organo-silicon oxide polymers may be molded to shape on polytetrafluoroethylene surfaces.

Furthermore, dams or other confining means may be applied to prevent the spreading of the film 14, or to confine the film to a predetermined configuration. For example, a thin sheet of polymerized tetrafluoroethylene having a thickness such as may be desired for the film 14 may be cut out to produce an aperture having a desired configuration and laid upon the surface 12. The fluid composition to be converted into a film is poured within the confines of the aperture until the aperture is filled and the fluid composition then converted to the solid state.

It will be apparent that the member 10 need not be composed entirely of polymerized tetrafluoroethylene, but may be prepared by applying a thin coating, layer or film of the polymerized tetrafluoroethylene upon a metallic base or refractory material or other suitable substance having sufficient rigidity. The polymerized tetrafluoroethylene may be mechanically bonded to suitably roughened surfaces of the metal or refractory base, or it may be held thereupon by mechanical clamping means.

It has been found that polymers of tetrafluoroethylene $(CF_2)_x$ having a transition point of about 300° C. or higher are well suited to the practice of the invention. These polymers are waxy in appearance and feel. They are available to the trade in the form of blocks of various shapes and sizes, and as sheets and tapes. Reinforced sheets of the polymer may be produced by applying two sheets of the tetrafluoroethylene polymer heated above the transition point on either side of a sheet of glass cloth, for example, and subjecting the sandwich so produced to a pressure sufficient to force the polymer into the interstices of the glass cloth.

For apparatus for casting continuous lengths of film or sheet material, reference should be had to the apparatus shown in Fig. 2 of the drawing. An endless belt 16 composed of a metal sheet 18 such as stainless steel, to which is attached a surface layer 20 of polymerized tetrafluoroethylene is supported for movement between the removable rollers 22 and 24. Suitable driving means (not shown) for the rollers 22 and 24 drive the belt 16 at a predetermined rate of speed. A relatively rigid table 26 is disposed beneath the upper portion of the belt 16 in order to maintain the belt in a plane in a predetermined horizontal position. Above the table 26 is disposed a fluid conveying means 28 such as a pipe or the like for depositing a fluid resinous composition 30 upon the tetrafluoroethylene belt surface 20. A doctor blade or other suitable means for spreading the composition 30 in a layer 34 of predetermined shape is disposed over the table 26. In operation the belt 16 carries the layer of predetermined thickness or shape of the composition 34 into an oven 36 for converting the fluid composition by heat treatment into a solid film or layer. On emerging from the oven 36, the film or layer is readily separated from the belt 20 by reason of the relative nonadherence of the solid composition to the polymerized tetrafluoroethylene, and may be rolled up into a roll 38 of film or sheet for any predetermined use. The oven 36 may be heated by any suitable means. Provision for a predetermined atmosphere within the oven may be made to accommodate the composition being treated in order to accelerate hardening or to prevent deterioration. Likewise, solvents, and other vapors given off by the composition during curing, may be removed by suitable exhaust means.

The apparatus of Fig. 2 may be employed in preparing moving picture or other photographic film from nitrocellulose or cellulose acetate solutions in readily volatile solvents. Films of polystyrene for insulation and capacitor uses may be produced in the apparatus of Fig. 2, either from solutions of the polymer or from monomeric styrene by the application of heat and catalyst. Various copolymer resins, such, for example, as copolymers of an unsaturated alkyd resin or an ester dissolved in a monomer having the group $H_2C=C<$ such, for example, as monostyrene, have been copolymerized into sheets and films.

For casting more complex shapes, reference should be had to the mold of Fig. 3 in which the cope 44 and the drag 52 of metal, refractory compositions or the like are combined to form a mold cavity of cylindrical cross section. The surfaces 46 of the cope and drag are coated with a thin layer 48 of polymerized tetrafluoroethylene. Similarly, the walls of the sprue opening 50 are lined with the polymerized tetrafluoroethylene. It is preferred to employ fluid resinous compositions substantially free from a volatile solvent in casting members in the apparatus of Fig. 3. Many compositions such as cellulose esters and ethers may be rendered fluid by simply heating them to an elevated temperature and thereafter the molten composition may be cast through the sprue 50. Resins composed of a monomeric solvent and another resinous material copolymerizable therewith may be cast in the apparatus of Fig. 3. Examples are a solution composed of monostyrene as the solvent and an ester, such, for example, as a glycol maleate or a castor oil maleate dissolved therein. By heating the assembled mold and the cast resinous composition in an oven, the composition will copolymerize into a solid body. Upon cooling a hardened member 52 with the sprue 54 is produced. Thereafter, the cope and drag 42, 44 may be disassembled and the cast member 52 readily removed and finished to shape. The sprue 54 may be sawed off or otherwise removed. The mold may be then reused.

Molds or dies of polymerized tetrafluoroethylene may be prepared from blocks of the polymer by forcing a metal die into the polymer under high pressures at temperatures above 300° C. to produce a mold cavity by reason of the "cold flow" of the polymer. Thus, for example, button molds may be produced by pressing a metal die having the shape of the button into a block or slab or the polymer. Fuid resinous composition may be poured into the mold cavity, treated by heating to solidify the resin and the buttons easily extracted from the cavity.

It will be apparent that not only thermoplastic and thermosetting resinous compositions as mentioned hereinbefore may be converted to solid bodies in molds whose surfaces are composed of polymerized tetrafluoroethylene, but numerous other compositions may be similarly molded to shape. Natural resins such as rosin, tung oil and shellac, with or without admixtures of synthetic resins, may be conveniently and easily formed to shape in molds having surfaces of polytetrafluoroethylene. Non-resinous or inorganic materials such as suspensions of bentonite may be cast into films of predetermined thickness upon surfaces formed of polymerized tetrafluoroethylene. Numerous hardening agents may be applied to the cast compositions while in contact with the polymerized tetrafluoroethylene in order to further convert or to modify the resins or inorganic films or the like The chemical inertness of polymerized tetrafluoroethylene is remarkable and it will withstand almost any known reagent or solvent.

It will be appreciated that many fluid compositions may be converted into a solid state by allowing a solvent to evaporate, with or without heating, while other compositions must be subjected to heat treatment at an elevated temperature.

Since certain obvious changes may be made in the structures described above and different embodiments of the invention could be made without departing from the scope thereof, it in intended that all matter contained in the above description or taken in connection with the accompanying drawing, shall be interpreted as illustrative and not in a limiting sense.

I claim as my invention:

1. A mold for the preparation of a solid body from fluid to solid convertible resinous compositions comprising, in combination, a hollow member having surfaces of predetermined shape and texture defining a hollow space suitable to produce the solid body by casting therein, the surfaces being composed essentially of polymerized tetrafluoroethylene.

2. A mold for the preparation of a solid body from a fluid to solid convertible resinous composition comprising, in combination, a base member, portions forming mold surfaces in the base member, the surfaces comprising essentially a layer of a polymerized tetrafluoroethylene.

3. A mold for the preparation of a solid body from a fluid to solid convertible resinous composition comprising, in combination, a base member, portions forming mold surfaces in the base member, the surfaces comprising essentially a layer of a polymerized tetrafluoroethylene, and reinforcing means applied to the polymerized tetrafluoroethylene composed of a fabric of glass fibers.

4. Apparatus for preparation of solid members from heat convertible fluid compositions comprising a movable base member, the outer surface of the base member composed of polymerized tetrafluoroethylene, an oven enclosing a portion of the movable base member for subjecting fluid composition on the base member to a temperature sufficient to convert it to the solid state, and means for driving the movable base member whereby the outer surface will pass through the oven.

JACK SWISS.

REFERENCES CITED

The following references are of record in the file of this patent:

UNITED STATES PATENTS

| Number | Name | Date |
| --- | --- | --- |
| 1,981,472 | Schneider | Nov. 20, 1934 |
| 2,144,548 | Safford | Jan. 17, 1939 |
| 2,230,654 | Plunkett | Feb. 4, 1941 |
| 2,247,818 | Nast | July 1, 1941 |
| 2,258,221 | Rochow | Oct. 7, 1941 |
| 2,396,629 | Alfthan | Mar. 19, 1946 |
| 2,400,091 | Alfthan | May 14, 1946 |
| 2,400,094 | Benning | May 14, 1946 |
| 2,400,099 | Brubaker | May 14, 1946 |
| 2,403,476 | Berry et al. | July 9, 1946 |
| 2,432,891 | Hervey | Dec. 16, 1947 |